United States Patent
Yu et al.

(10) Patent No.: US 11,662,896 B2
(45) Date of Patent: May 30, 2023

(54) METHOD OF CONTENT PRESENTATION, ELECTRONIC DEVICE AND STORAGE MEDIUM

(71) Applicant: Beijing Dajia Internet Information Technology Co., Ltd., Haidian (CN)

(72) Inventors: Yang Yu, Haidian (CN); Jianfang Zhang, Haidian (CN); Rui Chen, Haidian (CN); Song Xiang, Haidian (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 157 days.

(21) Appl. No.: 17/137,184

(22) Filed: Dec. 29, 2020

(65) Prior Publication Data

US 2021/0141522 A1 May 13, 2021

(30) Foreign Application Priority Data

Feb. 4, 2020 (CN) .......................... 202010079952.2

(51) Int. Cl.
*G06F 3/04847* (2022.01)
*G06F 3/04817* (2022.01)
(Continued)

(52) U.S. Cl.
CPC ........ *G06F 3/04847* (2013.01); *G06F 3/0482* (2013.01); *G06F 3/04817* (2013.01); *G06F 3/04842* (2013.01); *G06F 3/04886* (2013.01)

(58) Field of Classification Search
CPC ............. G06F 3/04847; G06F 3/04817; G06F 3/0482; G06F 3/04842; G06F 3/04886;
(Continued)

(56) References Cited

U.S. PATENT DOCUMENTS 6,961,912 B2 11/2005 Aoki et al.
8,812,995 B1 * 8/2014 Murphy ............. G01C 21/3664
715/764
(Continued)

FOREIGN PATENT DOCUMENTS

CN 105549830 5/2016
CN 106445378 2/2017
(Continued)

OTHER PUBLICATIONS

China National Intellectual Property Administration, "Office Action," issued in connection to Chinese Patent Application No. 202010079952.2, dated Dec. 4, 2020, 7 pages.
(Continued)

*Primary Examiner* — Seth A Silverman
(74) *Attorney, Agent, or Firm* — Hanley, Flight & Zimmerman, LLC

(57) ABSTRACT

Disclosed are a method, an electronic device and a storage medium of processing data. The method can include: playing an image in an image playing interface in response to an image playing request sent by an account; determining a target presentation area in the image playing interface in response to detecting a touch operation of the account on the image playing interface, wherein the target presentation area is used for presenting feedback information of the image and the feedback information includes a set of emojis; determining the set of emojis based on feature labels of the image; rendering emojis in the set to the target presentation area.

12 Claims, 18 Drawing Sheets

US 11,662,896 B2

Page 2

(51) Int. Cl.
*G06F 3/0482* (2013.01)
*G06F 3/04842* (2022.01)
*G06F 3/04886* (2022.01)

(58) Field of Classification Search
CPC ............... G06F 3/0488; G06F 3/0481; G06F 3/048886; G06Q 50/01; G06V 20/41
USPC .......................................................... 715/771
See application file for complete search history.

(56) References Cited

U.S. PATENT DOCUMENTS

| | | | |
|---|---|---|---|
| 10,050,926 B2 | 8/2018 | Ebersman et al. | |
| 2007/0008300 A1* | 1/2007 | Yang | G06F 3/04886 345/173 |
| 2008/0313538 A1* | 12/2008 | Hudson | G06F 3/04886 715/702 |
| 2011/0004821 A1* | 1/2011 | Miyazawa | G06F 3/0482 715/702 |
| 2012/0001858 A1* | 1/2012 | Matsuda | G06F 3/04883 345/173 |
| 2014/0195947 A1* | 7/2014 | Yang | G06F 3/04845 715/769 |
| 2015/0222586 A1* | 8/2015 | Ebersman | H04L 51/02 715/752 |
| 2015/0324082 A1* | 11/2015 | Aoshima | G06F 3/0482 715/769 |
| 2017/0270087 A1 | 9/2017 | Leydon et al. | |

FOREIGN PATENT DOCUMENTS

| | | |
|---|---|---|
| CN | 106462354 | 2/2017 |
| CN | 107977126 | 5/2018 |
| CN | 108390991 | 8/2018 |
| CN | 109634489 | 4/2019 |
| CN | 110377192 | 10/2019 |

OTHER PUBLICATIONS

Illendula, A. et al., "Which Emoji Talks Best for My Picture?" arxiv.org, Cornell University Library, Ithaca, New York, Aug. 27, 2018, XP081186024, 8 pages.

Cappallo, S. et al., "Image2Emoji: Zero-shot Emoji Prediction for Visual Media," Multimedia, ACM, 2 Penn Plaza, Suite 701, New York, NY, Oct. 13, 2015, 5 pages.

* cited by examiner

METHOD OF CONTENT PRESENTATION, ELECTRONIC DEVICE AND STORAGE MEDIUM

CROSS REFERENCE TO RELATED APPLICATION

This application is based on and claims priority under 35 U.S.C 119 to Chinese Patent Application No. 202010079952.2, filed on Feb. 4, 2020, in the China National Intellectual Property Administration. The entire disclosure of the above application is incorporated herein by reference.

FIELD

The disclosure relates to the field of computer technology, and in particular to a method and apparatus, an electronic device and a storage medium for processing data.

BACKGROUND

With the development of science and technology, the image works played on touchable devices such as mobile phones and tablets are becoming more and more popular, and users can express their love for works by commenting on works, giving likes to works, etc. new method and device for processing data is needed to improve the degree of interaction.

SUMMARY

The disclosure provides a method, an electronic device and a non-transitory computer-readable storage medium for processing data.

According to a first aspect, embodiments of the disclosure provide a method for processing data. The method includes: playing an image in an image playing interface in response to an image playing request sent by an account; determining a target presentation area in the image playing interface in response to detecting a touch operation of the account on the image playing interface, wherein the target presentation area is used for presenting feedback information of the image and the feedback information includes a set of emojis; determining the set of emojis based on feature labels of the image; rendering emojis in the set to the target presentation area.

According to a second aspect, embodiments of the disclosure provide an electronic device for processing data. The electronic device includes: a memory configured to store executable instructions, and a processor configured to read and execute the executable instructions stored in the memory to implement the method of processing data. The method includes: playing an image in an image playing interface in response to an image playing request sent by an account; determining a target presentation area in the image playing interface in response to detecting a touch operation of the account on the image playing interface, wherein the target presentation area is used for presenting feedback information of the image and the feedback information includes a set of emojis; determining the set of emojis based on feature labels of the image; rendering emojis in the set to the target presentation area.

According to a third aspect, embodiments of the disclosure provide a storage medium for processing data. When the instructions in the storage medium are executed by a processor, the processor can perform the method of processing data. The method includes: playing an image in an image playing interface in response to an image playing request sent by an account; determining a target presentation area in the image playing interface in response to detecting a touch operation of the account on the image playing interface, wherein the target presentation area is used for presenting feedback information of the image and the feedback information includes a set of emojis; determining the set of emojis based on feature labels of the image; rendering emojis in the set to the target presentation area.

It should be understood that the above general description and the following detailed description are only exemplary and illustrative, and cannot limit the disclosure.

BRIEF DESCRIPTION OF THE DRAWINGS

The accompanying drawings here are incorporated into and constitute a part of the specification, illustrate the embodiments conforming to the disclosure, and together with the specification, serve to explain the principles of the disclosure, but not constitute an improper limitation on the disclosure.

DETAILED DESCRIPTION OF THE EMBODIMENTS

In order to enable those ordinary skilled in the art to better understand the technical solutions of the disclosure, the technical solutions in the embodiments of the disclosure will be described clearly and completely with reference to the accompanying drawings.

It should be noted that the terms such as "first", "second" and the like in the specification and claims of the disclosure and the above drawings are used to distinguish the similar objects, but not necessarily to describe a particular order or sequence. It should be understood that the data used in this way is interchangeable under appropriate circumstances, so that the embodiments of the disclosure described herein can be implemented in an order other than those illustrated or described herein. The implementation modes described in the following exemplary embodiments do not represent all the implementation modes consistent with the disclosure. On the contrary, they are only the examples of the devices and methods which are detailed in the attached claims and consistent with some aspects of the disclosure.

Some embodiments provide a method of processing data. The method includes: playing an image in an image playing interface in response to an image playing request sent by an account; determining a target presentation area in the image playing interface in response to detecting a touch operation of the account on the image playing interface, wherein the target presentation area is used for presenting feedback information of the image and the feedback information includes a set of emojis; determining the set of emojis based on feature labels of the image; rendering emojis in the set to the target presentation area.

The embodiments of the disclosure will be illustrated below in details in combination with the drawings.

Figure 1:
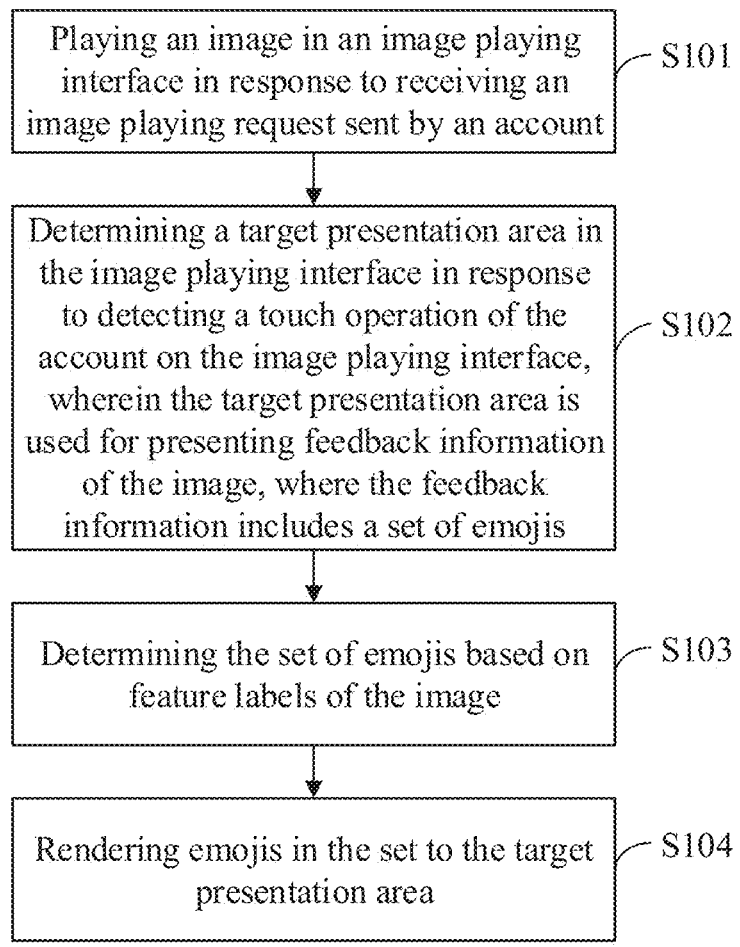
FIG. 1 is a schematic diagram of a method for processing data according to some embodiments.

Referring to FIG. 1, in some embodiments, the method of processing data includes the following operations. In some embodiments, the method of processing data may be applied in an electronic device or other terminals.

S101: playing an image in an image playing interface in response to receiving an image playing request sent by an account.

In some embodiments, the electronic device may obtain the image playing request sent by the account, and playing the image in the image playing interface.

S102: determining a target presentation area in the image playing interface in response to detecting a touch operation of the account on the image playing interface, where the target presentation area is used for presenting feedback information of the image.

In some embodiments, the feedback information includes a set of emojis. In some embodiments, each emojis indicates one kind of feedback information.

In some embodiments, the electronic device may obtain the touch operation of the account on the image playing interface, and determining the target presentation area in the image playing interface, where the target presentation area is used to present the image feedback information.

In some embodiments, the touch operation may be any one of the following operations: long press, single-click, and double-click.

In some embodiments, in S102, the operation of determining the target presentation area based on the touch operation includes the following.

A1: determining a touch point in the image playing interface based on the touch operation, and determining a candidate presentation area based on the touch point.

Figure 2:
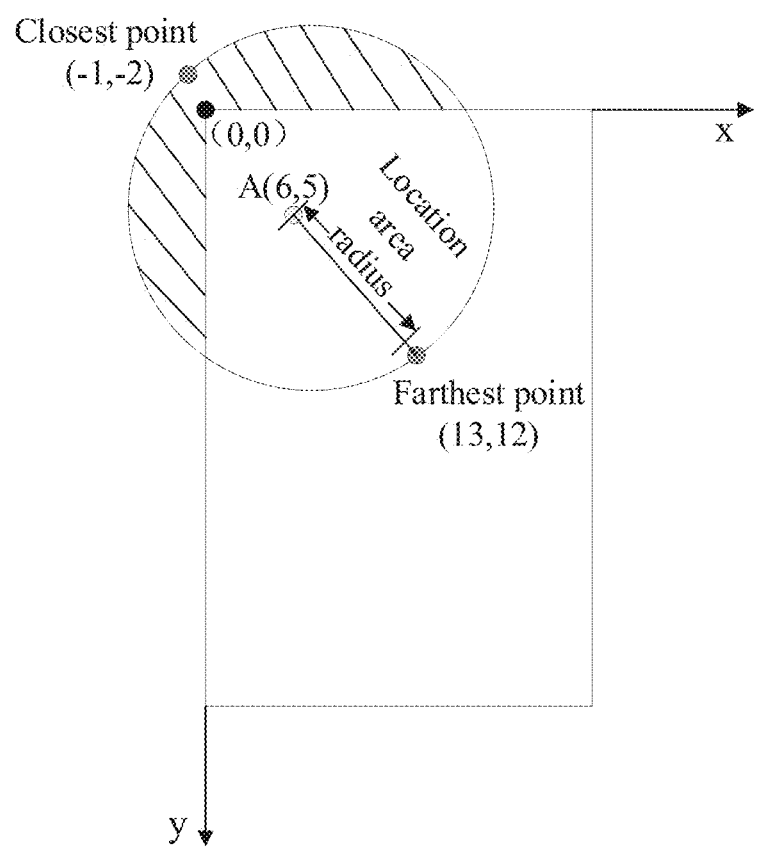
FIG. 2 is a schematic diagram showing the generation of the candidate presentation area based on an initial touch point according to some embodiments.

In some embodiments, the image playing interface may be a video playing interface or a picture playing interface. In some embodiments, taking a video playing interface as an example, the pixel at the upper left of the video playing interface is determined as the origin, and the rectangular plane coordinate system as shown in FIG. 2 is established.

In some embodiments, the operation of determining the candidate presentation area based on the touch point includes: generating the candidate presentation area based on coordinates of an initial touch point, wherein the initial touch point is determined based on the touch operation; updating the candidate presentation area based on the touch point iteratively in response to the candidate presentation area not conforming to an area presentation rule, wherein the touch point is adjusted based on the initial touch point.

In some embodiments the above operations can be implemented as the following a11-a14.

a11: determining an initial touch point in the image playing interface based on the touch operation, and generating a candidate presentation area based on the coordinates of the initial touch point.

In some embodiments, taking the video playing interface as an example, the coordinates of the initial touch point are determined based on the rectangular plane coordinate system shown in FIG. 2. The horizontal and vertical coordinates of the initial touch point are respectively added with a location area radius to obtain the coordinates of the point farthest from the origin. Similarly, the horizontal and vertical coordinates of the initial touch point are respectively subtracted by the location area radius to obtain the coordinates of the point closest to the origin. The location area radius is used to determine the location of the respective emojis in the candidate presentation area.

Then a circular area is determined by taking the coordinates of the initial touch point as the circle center, and taking the coordinates of the farthest point and the coordinates of the closest point as the endpoints on the circle. The circular area is determined as the candidate presentation area.

In some embodiments, a specific example is given as shown below.

the coordinates of the initial touch point A are (6, 5) and the location area radius is 7 cm. After calculation, the coordinates of the farthest point are determined as (13, 12) and the coordinates of the closest point are determined as (−1, −2), and the circular area shown in FIG. 2 is determined as a candidate presentation area.

a12: determining whether the current candidate presentation area conforms to an area presentation rule, and in response to that the current candidate presentation area conforms to the area presentation rule, outputting the current candidate presentation area; while in response to that the current candidate presentation area does not conform to the area presentation rule, performing a13.

In some embodiments, the current candidate presentation area is an area generated based on coordinates of the currently determined touch point. For example, the candidate presentation area based on the coordinates of the initial touch point in a11 is the current candidate presentation area in a12.

In a case that the coordinates of the farthest point and/or the coordinates of the closest point are outside the video playing interface, it is determined that the overlap ratio between the current candidate presentation area and the video playing interface is out of the set threshold range. That is, the current candidate presentation area does not conform to the area presentation rule. In this case, the emojis set corresponding to the video cannot be fully presented in the candidate presentation area.

In some embodiments, in order to allow the regenerated candidate presentation locations to fully present the emojis, the location of the touch point needs to be adjusted.

For example, the coordinates of the initial touch point A is (6, 5) and the location area radius R is 7 cm. After calculation, the coordinates of the farthest point are determined as (13, 12) and the coordinates of the closest point are determined as (−1, −2). Since the closest point is outside the video playing interface, it is determined that the current candidate presentation area does not conform to the area presentation rule.

For another example, the coordinates of the initial touch point A is (6, 5) and the location area radius R is 5 cm. After calculation, the coordinates of the farthest point are determined as (11, 10) and the coordinates of the closest point are determined as (1, 0). The closest point and the farthest point are both located in the picture playing interface, thus it is determined that the currently candidate presentation area conforms to the area presentation rule.

a13: obtaining adjusted coordinates by adjusting coordinates of the current touch point, and returning to a12.

In these embodiments, the current touch point is the touch point currently determined, for example, the initial touch point in a11 is the current touch point in a13.

In some embodiments, the process of adjusting the coordinates of the current touch point is as follows:

determining an overlap ratio between the current candidate presentation area and the image playing interface; updating the touch point by adjusting the initial touch point based on center of the image playing interface in response to the overlap ratio being out of a threshold range.

In some embodiments, in response to determining that the overlap ratio between the current candidate presentation area and the image playing interface is out of the threshold range, adjusting the coordinates of the current touch point based on the center of the image playing interface to obtain the coordinates of adjusted touch point. As such, the touch point is updated iteratively by such adjustments.

In some embodiments, the horizontal and vertical coordinates of the initial touch point shift respectively by a distance along the positive direction of x axis and the positive direction of y axis to shorten the distance between the touch point and the center point of the image playing interface.

a14: generating the candidate presentation area based on the coordinates of the adjusted touch point, and returning to a12. As such, one update of the candidate presentation area is finished.

For example, the coordinates (6, 5) of the initial touch point respectively shift by one unit length along the positive direction of x axis and the positive direction of y axis to obtain the coordinates (7, 6) of the adjusted touch point A'. The location area radius R is set to 7 cm. After calculation, the coordinates of the farthest point are determined as (14, 13) and the coordinates of the closest point are determined as (0, −1). Since the closest point is located outside the picture playing interface, it is determined that the current candidate presentation area does not conform to the area presentation rule, and the coordinates of the current touch point need to be adjusted again.

Figure 3:
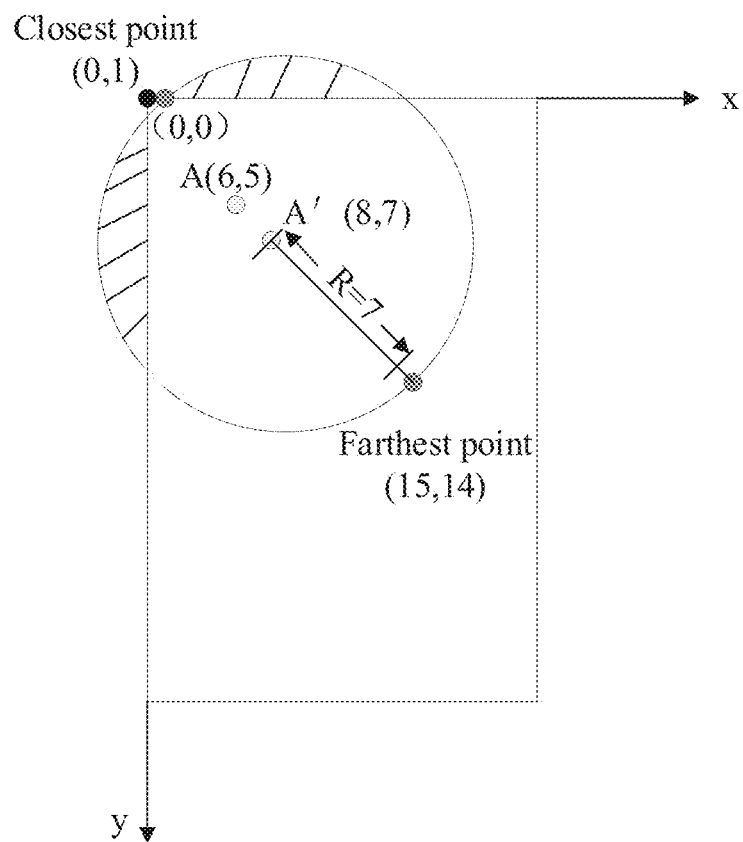
FIG. 3 is a schematic diagram showing the generation of the candidate presentation area based on the coordinates of the adjusted touch point according to some embodiments.

For another example, the coordinates (6, 5) of the initial touch point are respectively moved by two unit lengths along the positive direction of x axis and the positive direction of y axis to obtain the coordinates (8, 7) of the adjusted touch point A'. The location area radius R is set to 7 cm. After calculation, the coordinates of the farthest point are determined as (15, 14) and the coordinates of the closest point are determined as (1, 0). Since the closest point and the farthest point are both located in the video playing interface, it is determined that the current candidate presentation area conforms to the area presentation rule. FIG. 3 shows the candidate presentation area generated based on A'(8, 7).

A2: determining a candidate location set in the candidate presentation area based on the touch point and an angle range set, where the candidate location set conforms to a location presentation rule and candidate locations are used for rendering respective emojis.

In some embodiments, the candidate presentation area spreads in eight directions and the angle range in each direction is different. The mapping relationship includes: to the upper left—[45°, 225°], to the left—[90° 270°], to the upper right—[315°, 135°], to the right—[270°, 90°], to the lower left—[135°, 315°], to the lower right—[225°, 45°], upward—[0°, 180°], and downward—[180°, 360°].

In some embodiments, in A2, the process of determining a candidate location set that conforms to the location presentation rule based on the touch point and the angle range set is as follows.

a21: reading an angle range in the angle range set based on the priority order.

The order of the priorities of directions from high to low is set as: to the upper left, to the left, to the upper right, to the right, to the lower left, to the lower right, upward, downward.

a22: determining an offset angle corresponding to each emoji in the candidate presentation area based on a result of dividing the angle range.

In some embodiments, firstly, the total offset angle θ corresponding to the direction is determined based on the angle range;

the ratio of θ/(n−1) is determined as the offset corresponding to each emoji, where n represents the total number of emojis;

finally, the offset angle corresponding to each emoji in the candidate presentation area are determined based on the offset.

In some embodiments, in a case that the angle range of expanding to the lower right is [225°, 45°], the total offset angle is 180°, and there are 5 emojis. In this case, offset corresponding to each of the emojis in the candidate presentation area is 45°. Thus, the offset angle corresponding to the first one is 225°, the offset angle corresponding to the second one is 270°, the offset angle corresponding to the third one is 315°, the offset angle corresponding to the fourth one is 360°, and the offset angle corresponding to the fifth one is 45°.

a23: calculating the candidate location corresponding to each emoji in the candidate presentation area based on the location area radius and the offset angle.

Figure 4:
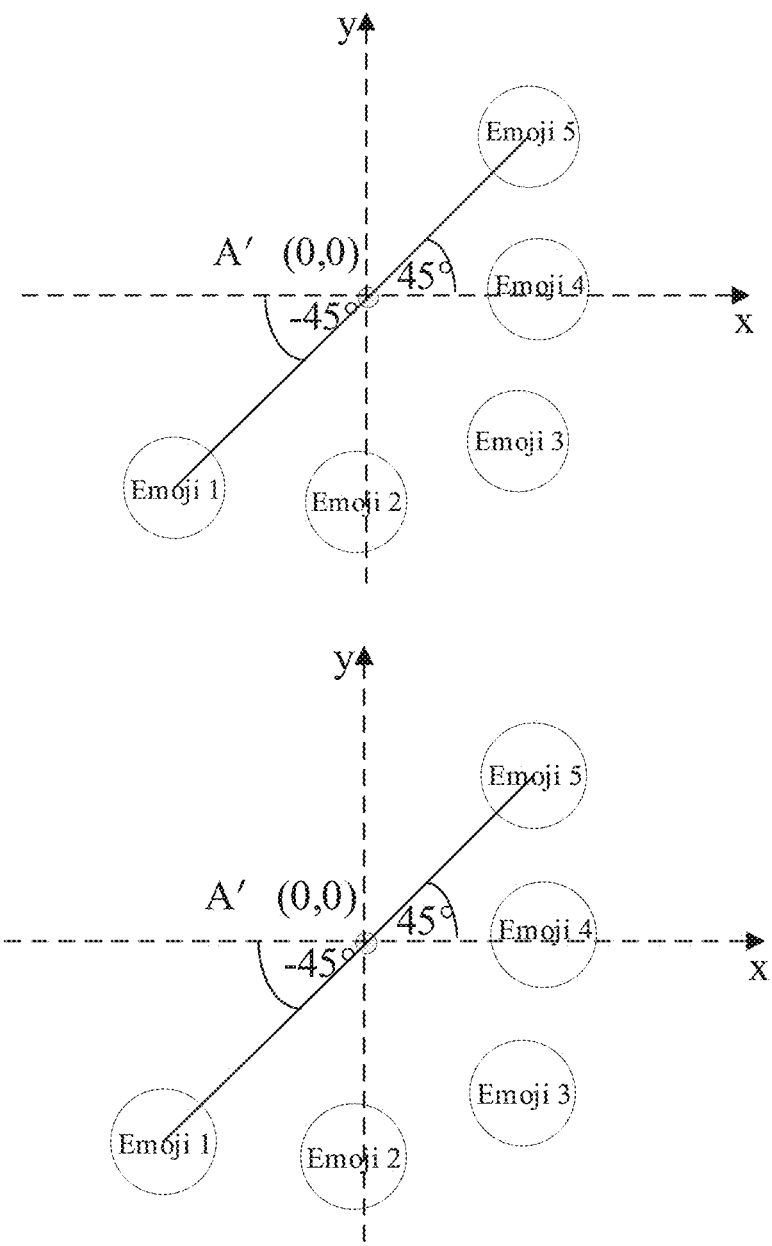
FIG. 4 is a schematic diagram showing candidate locations of various emojis according to some embodiments.

In some embodiments, referring to FIG. 4, taking the touch point coordinates A'(8, 7) as the origin, a rectangular plane coordinate system is established. Based on the included angle between each emoji and x axis as well as the location area radius, the candidate location corresponding to each emoji in the candidate presentation area is determined. Taking the calculation of the first emoji as an example, its abscissa is 7×cos 225°, and its ordinate is 7×sin 225°, and finally the candidate location of the first emoji in the candidate presentation area is $$\left(-\frac{7\sqrt{2}}{2}, -\frac{7\sqrt{2}}{2}\right).$$

a24: determining whether each candidate location conforms to the location presentation rule; in response to all candidate locations conforming to the location presentation rule, outputting the candidate location set; in response to a fact that not all candidate locations conform to the location presentation rule, returning to a21.

In some embodiments, in response to all candidate locations being located in the image playing interface, it is determined that all candidate locations conform to the location presentation rule.

In some embodiments, in a case that the candidate location X is located in the image playing interface, it is determined that the candidate location X conforms to the location presentation rule, which indicates that the emoji corresponding to the candidate location X can be completely presented in the candidate presentation area. In a case that the candidate location X is not located in the image playing interface, it is determined that the candidate location X does not conform to the location presentation rule, which indicates that the emoji corresponding to the candidate location X cannot be completely presented in the candidate presentation area.

A3: determining the target presentation area based on the candidate presentation area for which the candidate location set has been determined.

Figure 5:
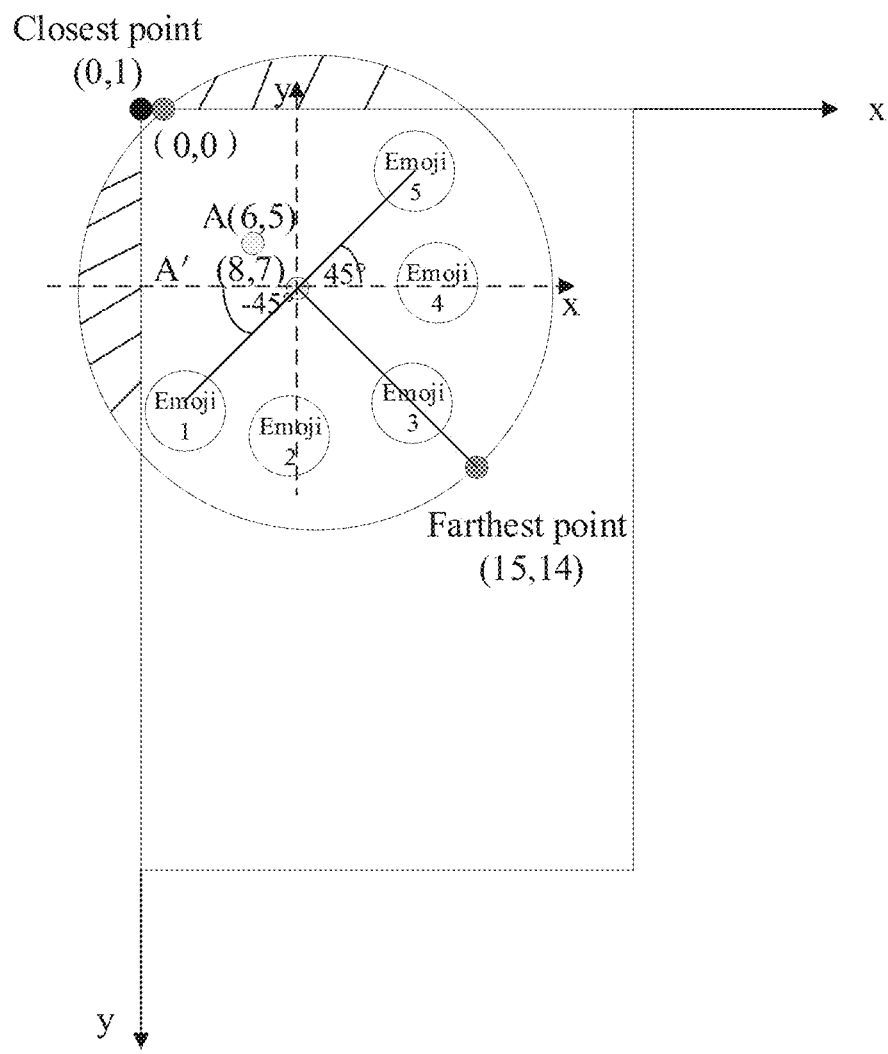
FIG. 5 is a schematic diagram showing a target presentation area according to some embodiments.
Figure 6A:
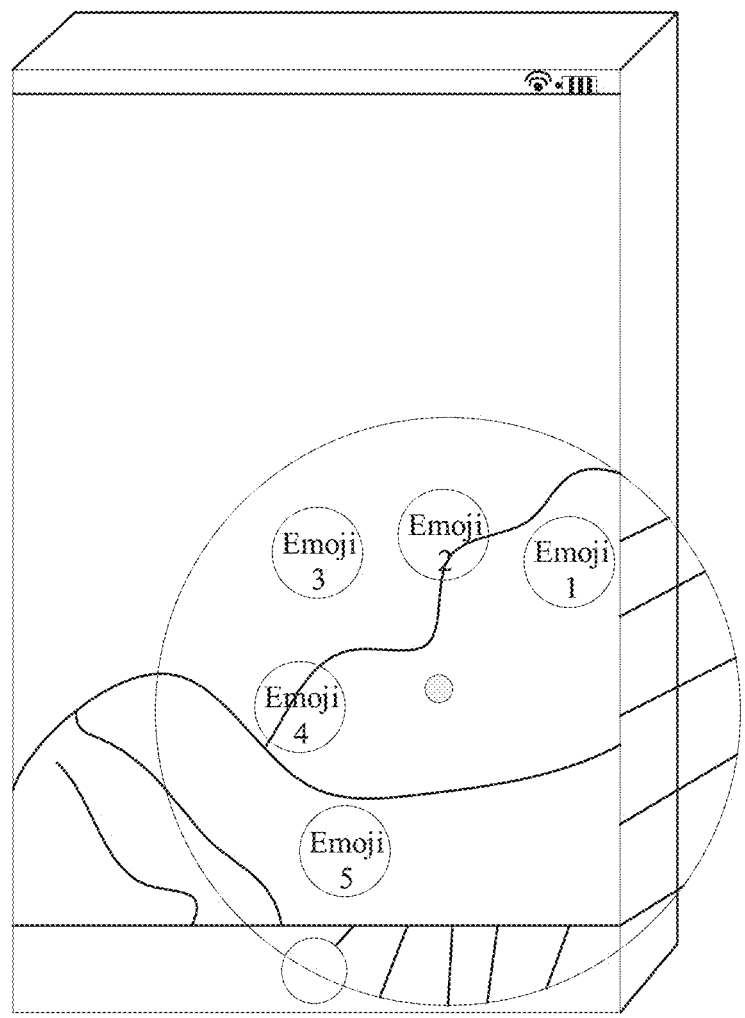
FIG. 6A is a schematic diagram showing a target presentation area, expanding to the upper left from the touch point, in the video playing interface according to some embodiments.
Figure 6B:
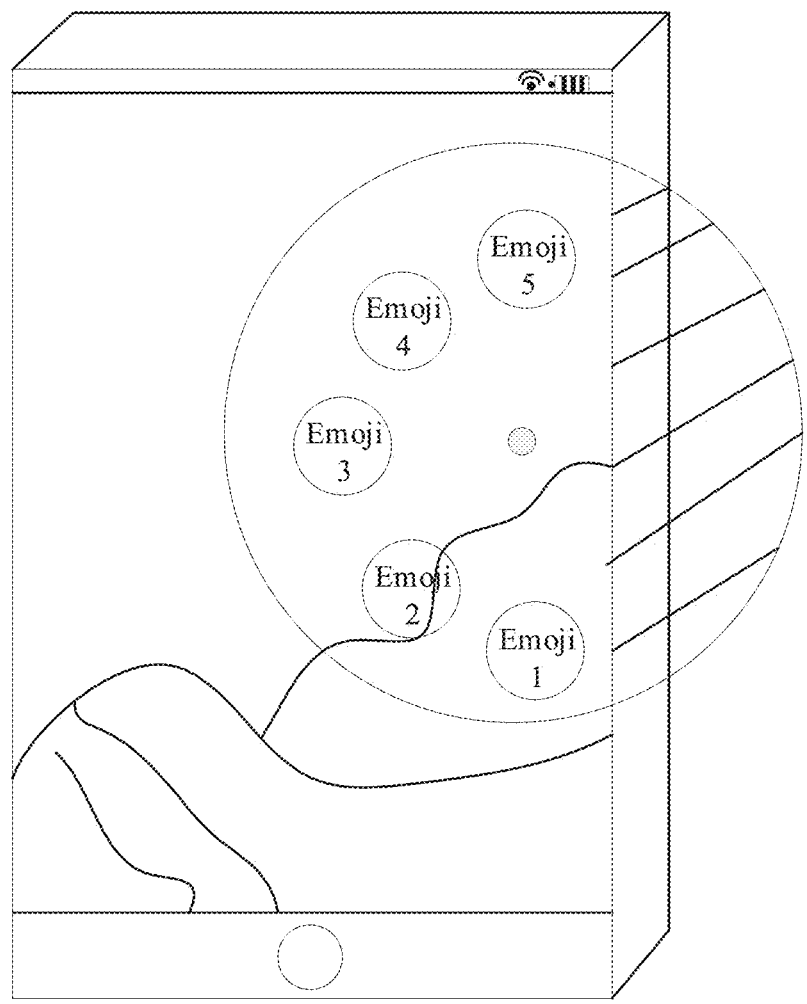
FIG. 6B is a schematic diagram showing a target presentation area, expanding to the left from the touch point, in the video playing interface according to some embodiments.
Figure 6C:
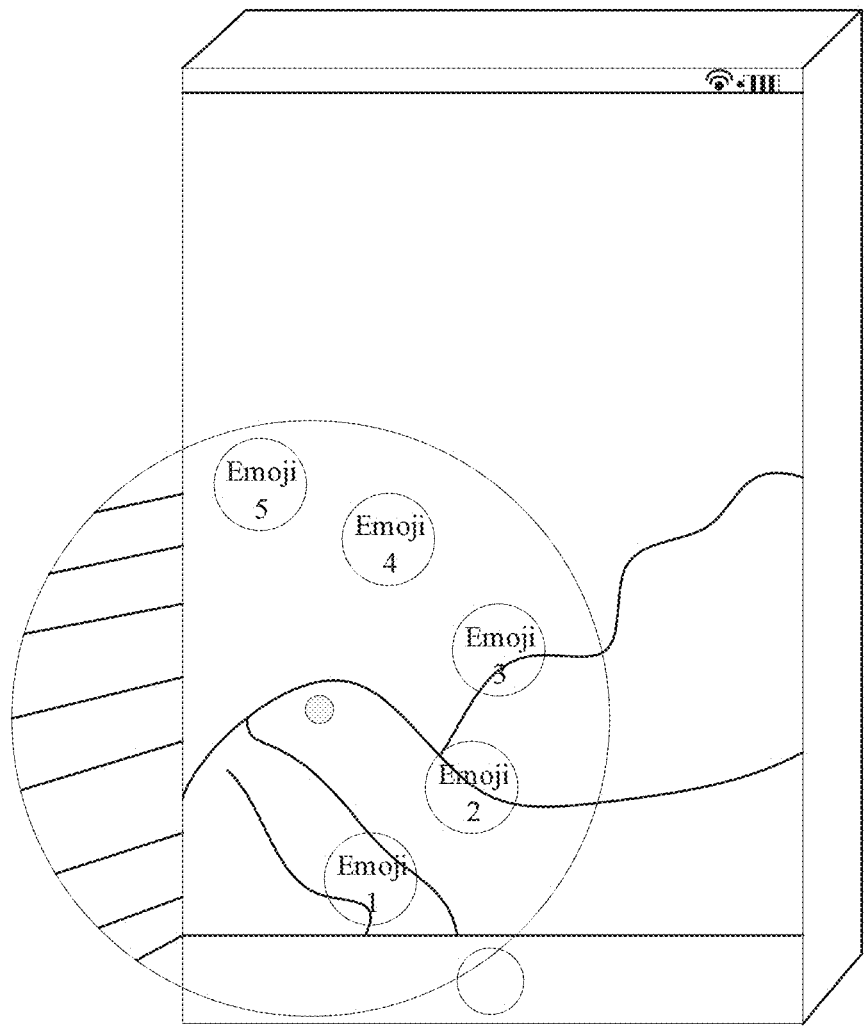
FIG. 6C is a schematic diagram showing a target presentation area, expanding to the upper right from the touch point, in the video playing interface according to some embodiments.
Figure 6D:
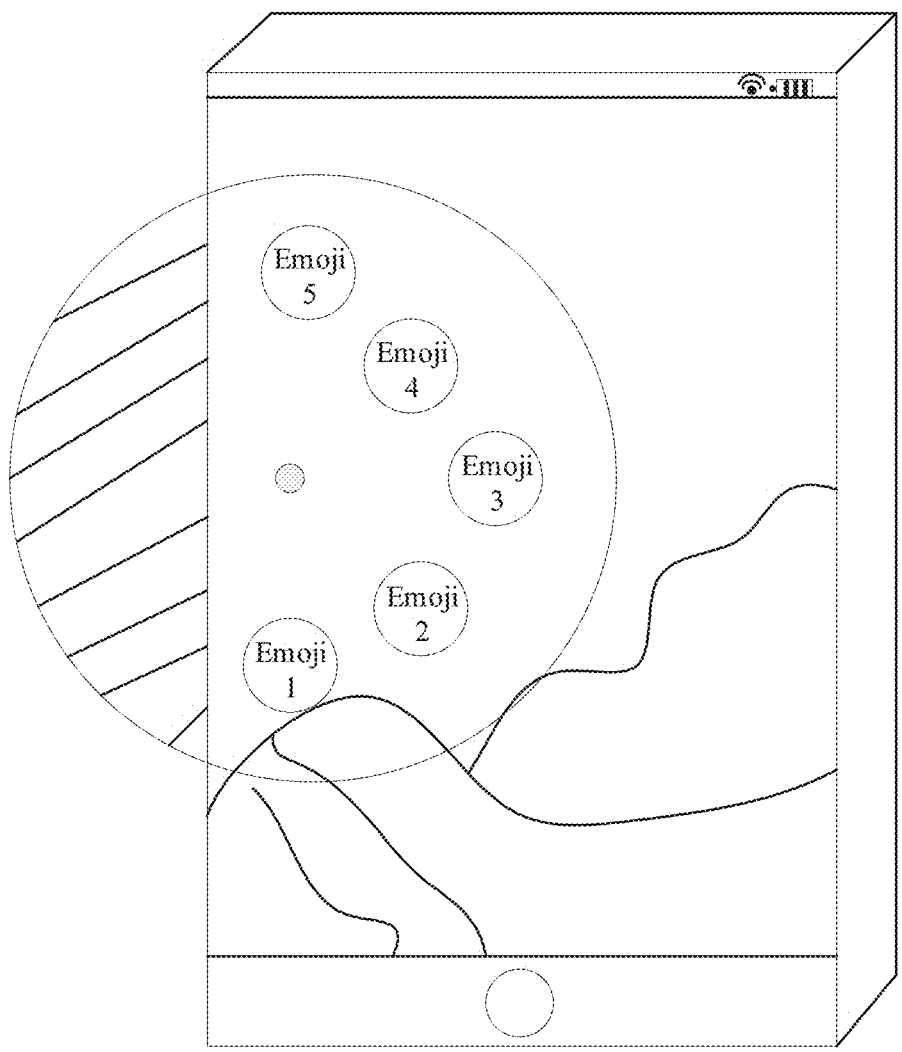
FIG. 6D is a schematic diagram showing a target presentation area, expanding to the right from the touch point, in the video playing interface according to some embodiments.
Figure 6E:
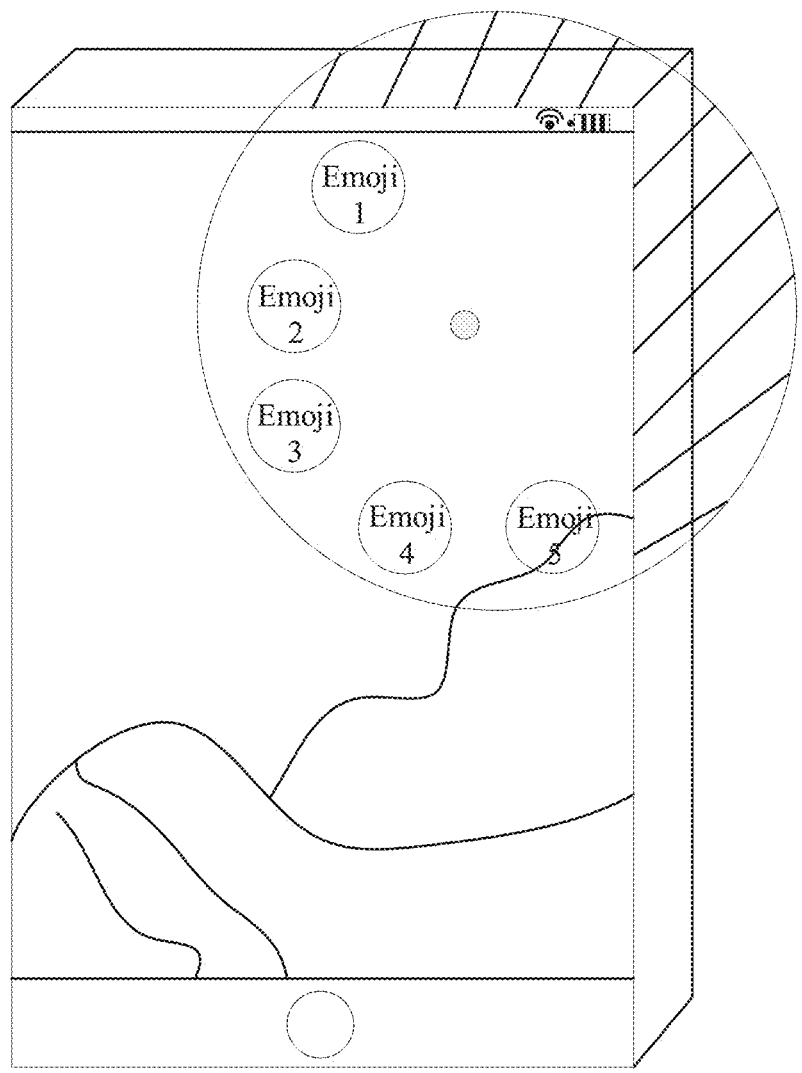
FIG. 6E is a schematic diagram showing a target presentation area, expanding to the lower left from the touch point, in the video playing interface according to some embodiments.
Figure 6F:
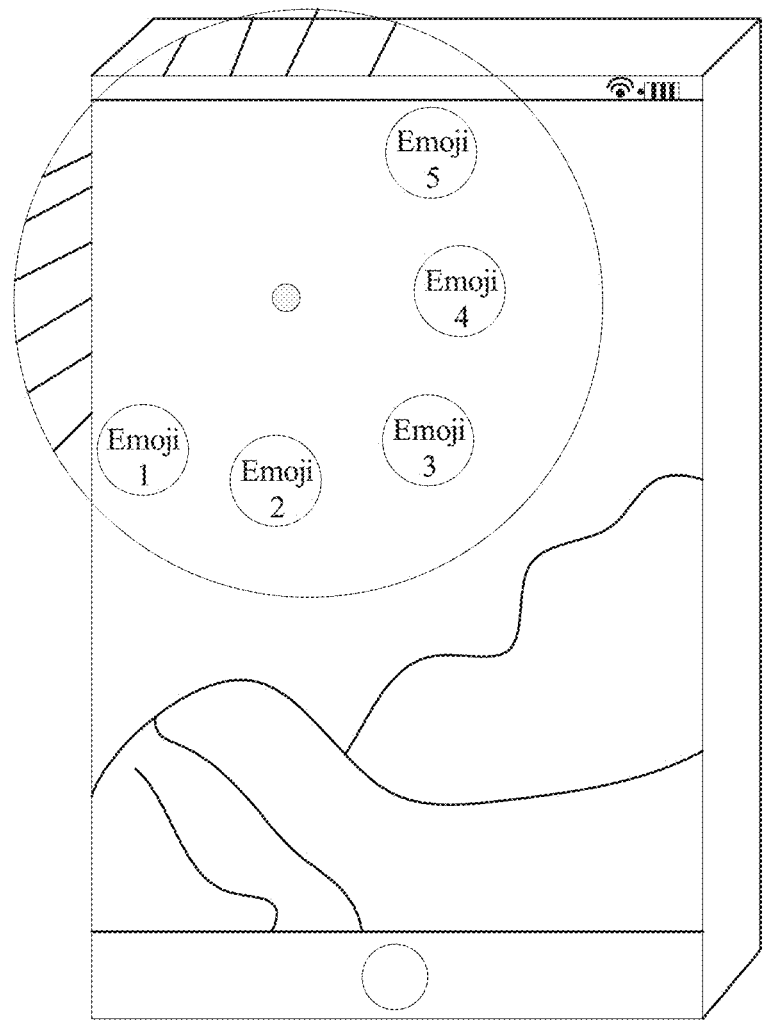
FIG. 6F is a schematic diagram showing a target presentation area, expanding to the lower right from the touch point, in the video playing interface according to some embodiments.
Figure 6G:
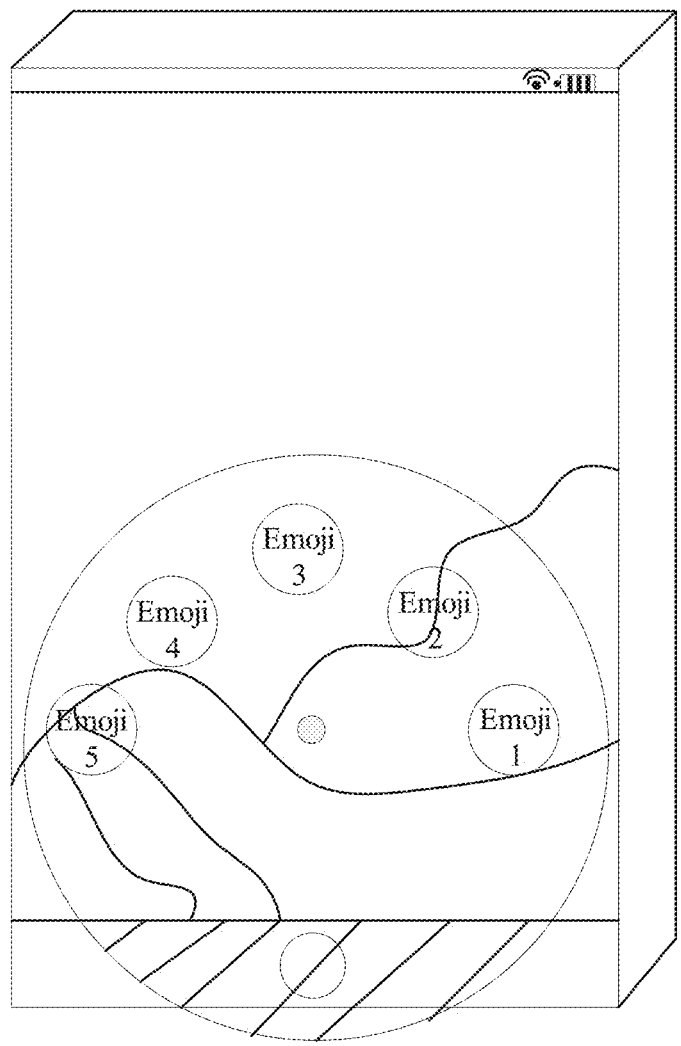
FIG. 6G is a schematic diagram showing a target presentation area, expanding upward from the touch point, in the video playing interface according to some embodiments.
Figure 6H:
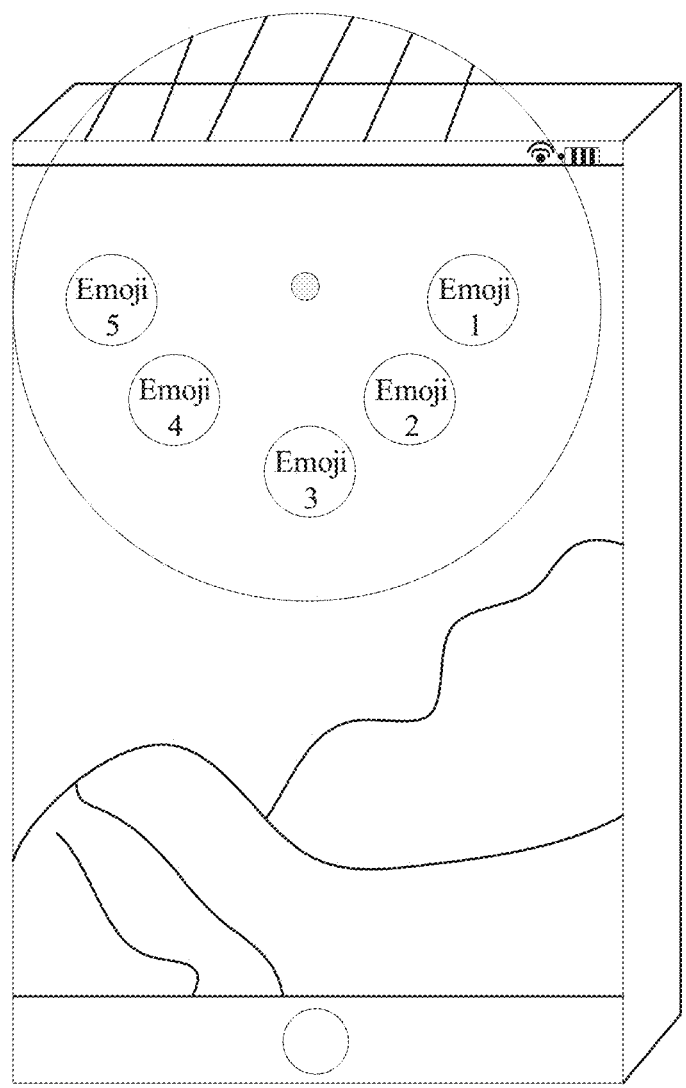
FIG. 6H is a schematic diagram showing a target presentation area, expanding downward from the touch point, in the video playing interface according to some embodiments.
Figure 6I:
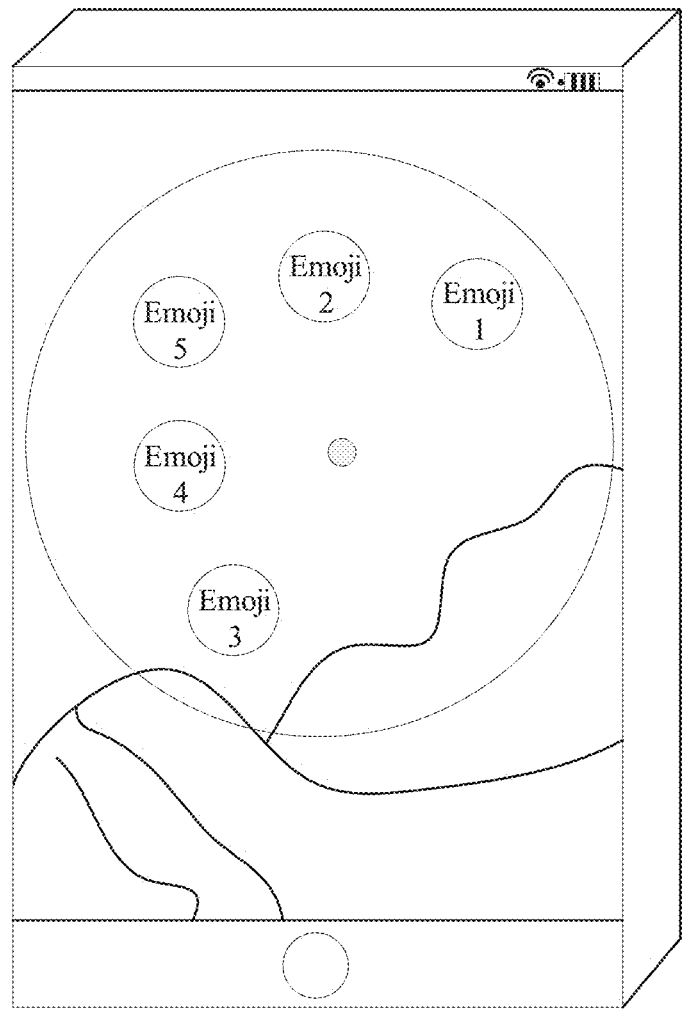
FIG. 6I is a schematic diagram showing a target presentation area with the center point of the video playing interface as the center according to some embodiments.
Figure 6J:
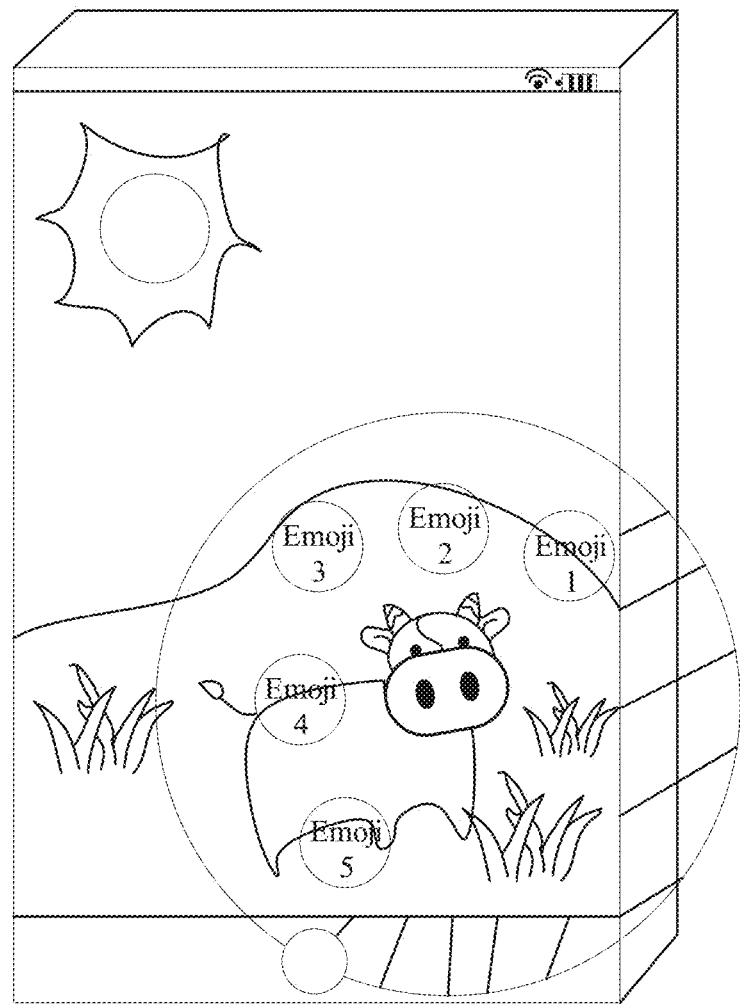
FIG. 6J is a schematic diagram showing a target presentation area, expanding to the upper left from the touch point, in the picture playing interface according to some embodiments.
Figure 6K:
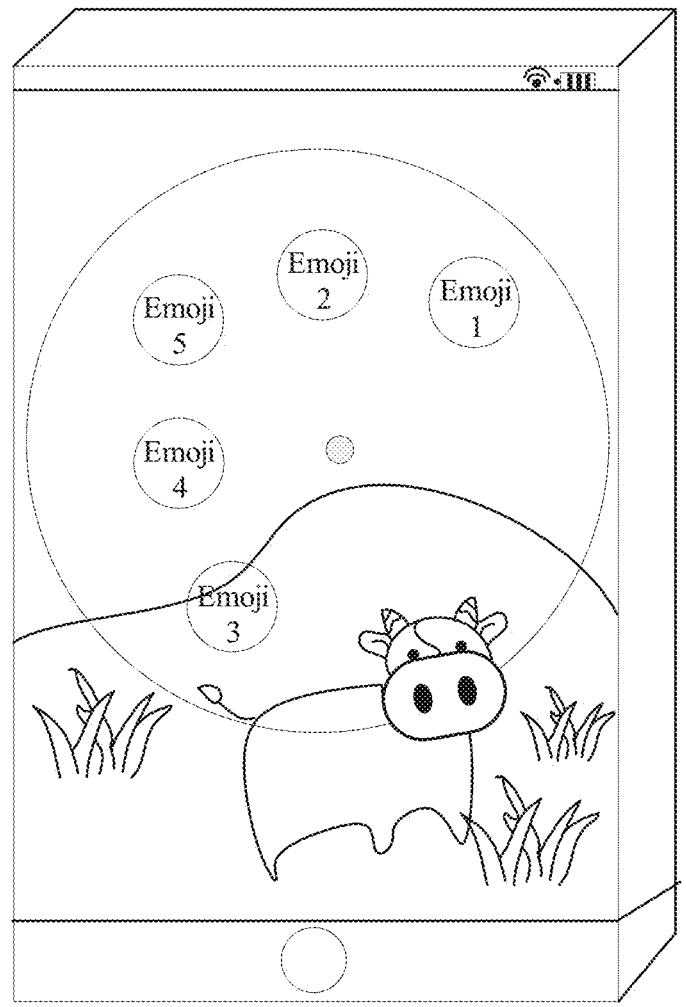
FIG. 6K is a schematic diagram showing a target presentation area with the center point of the picture playing interface as the center according to some embodiments.

In some embodiments, if the candidate location set is determined in the current candidate presentation area, this current candidate presentation area is determined as the target presentation area. The target presentation area, for example, is output as shown in FIG. 5.

S103: determining the set of emojis based on feature labels of the image.

As described above, the feedback information includes a set of emojis. That is, the set of emojis is used to indicate the feedback of the image. For example, each emoji indicates one kind of feedback information.

In some embodiments, the set of emojis can be determined based on feature labels of the image.

In some embodiments, feature labels corresponding to the image are obtained, and the emojis set is determined based on the feature labels.

In some embodiments, the feature label may be anyone or a combination of: the type of the image, the emoji used by the account with a usage frequency reaching a threshold the geographic location of the account login; and the emojis used for this image with a usage frequency during a period reaching the threshold. The process of establishing the mapping relationship between feature labels and the emojis sets will be described by using multiple specific embodiments described below. However, the embodiments do not limit the total number of feedback expressions corresponding to one feature label.

In some embodiments, the mapping relationship between video categories and emojis sets is established, and the emojis corresponding to the funny videos are: smile, snicker, laugh, laugh with tears and give a like.

In some embodiments, the mapping relationship between picture categories and emojis sets is established, and the emojis corresponding to the touching pictures are: give a like, weep, cry and cheer.

In some embodiments, the emoji used by the account with a usage frequency reaching a threshold are: give a like, angry and laugh, and these emojis are determined as feedback information.

In some embodiments, determining the emojis based on the login geographic location of the account can include: a tea restaurant is determined by positioning, and the corresponding emojis are: happy, laugh, drink, food and give a like.

In some embodiments, the emojis used for this image with a usage frequency within a week reaching the threshold are: give a like, cry, anger, laugh and applaud, and these five emojis are determined as feedback information.

In some embodiments, when an account is watching a funny video at home, the corresponding emojis are: laugh, smile, snicker, give a like, house icon.

S104: rendering the respective emojis in the emojis set to the target presentation area.

In some embodiments, the rendered target presentation areas that are finally output are shown as in FIGS. 6A to 6K.

Figure 7:
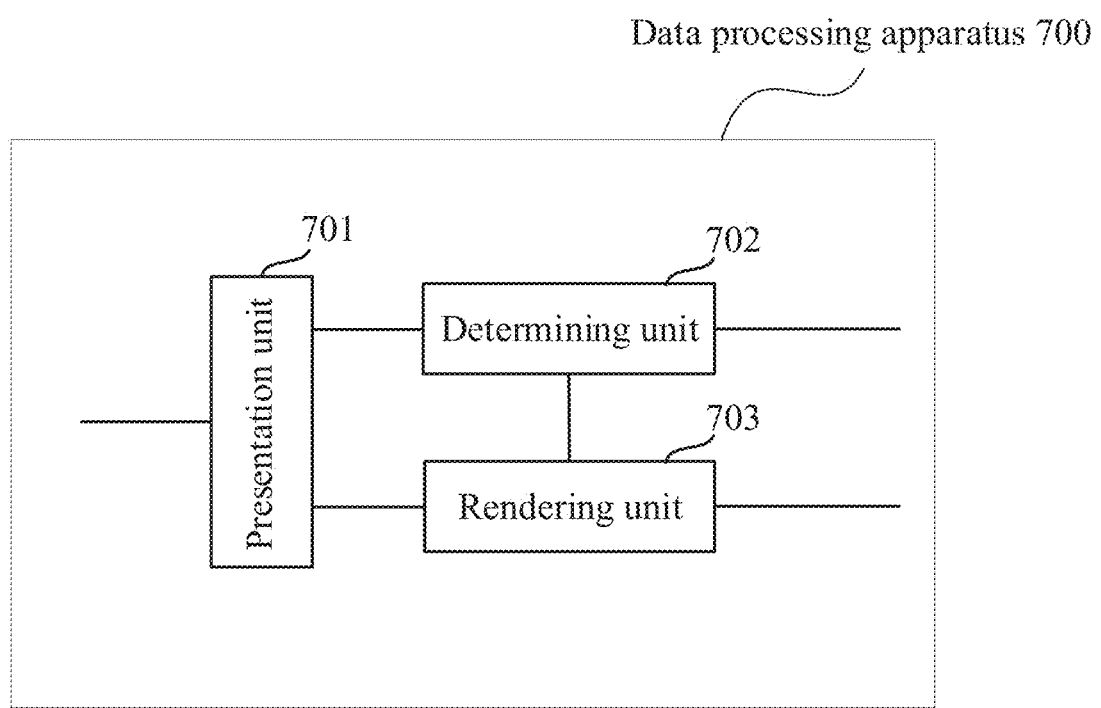
FIG. 7 is a block diagram of a device for processing data according to some embodiments.

Based on the foregoing embodiments and referring to FIG. 7, in some embodiments, an apparatus of processing data 700 is provided. The apparatus at least includes a presentation unit 701, a determining unit 702 and a rendering unit 703, where:

the presentation unit 701 is configured for playing an image in an image playing interface in response to receiving an image playing request sent by an account:

the determining unit 702 is configured for determining a target presentation area in the image playing interface in response to detecting a touch operation of the account on the image playing interface, wherein the target presentation area is used for presenting feedback information of the image and the feedback information includes a set of emojis; and determining the set of emojis based on feature labels of the image;

the rendering unit 703 is configured for rendering emojis in the set to the target presentation area.

In some embodiments, when determining a target presentation area in the image playing interface based on a touch operation of the account on the image playing interface, the determining unit 702 is configured for:

determining a candidate presentation area based on a touch point in the image playing interface, wherein the touch point is determined based on the touch operation;

determining a candidate location set in the candidate presentation area based on the touch point and an angle range set, wherein the candidate location set conforms to a location presentation rule and candidate locations are used for rendering respective emojis;

determining the target presentation area based on the candidate presentation area for which the candidate location set has been determined.

In some embodiments, when determining a candidate presentation area based on a touch point, the determining unit 702 is configured for:

generating the candidate presentation area based on coordinates of an initial touch point, wherein the initial touch point is determined based on the touch operation;

updating the candidate presentation area based on the touch point iteratively in response to the candidate presentation area not conforming to an area presentation rule, wherein the touch point is adjusted based on the initial touch point.

In some embodiments, when obtaining coordinates of an adjusted touch point, the determining unit 702 is configured for:

determining an overlap ratio between the candidate presentation area and the image playing interface;

updating the touch point by adjusting the initial touch point based on a center of the image playing interface iteratively in response to the overlap ratio being out of a threshold range.

In some embodiments, when determining a candidate location set, the determining unit 702 is configured for:

determining an offset angle corresponding to each emoji in the candidate presentation area based on a result of dividing an angle range, where the angle range is selected from the angle range set;

calculating a candidate location corresponding to each emoji in the candidate presentation area based on a location area radius and the offset angle;

determining that all candidate locations conform to the location presentation rule in response to all candidate locations being located in the image playing interface.

In some embodiments, the feature label used by the determining unit 702 is any one or a combination of:

category of the image;

emoji used by the account with a usage frequency reaching a threshold;

geographic location of the account login:

emojis used for this image with a usage frequency during a period reaching the threshold.

Figure 8:
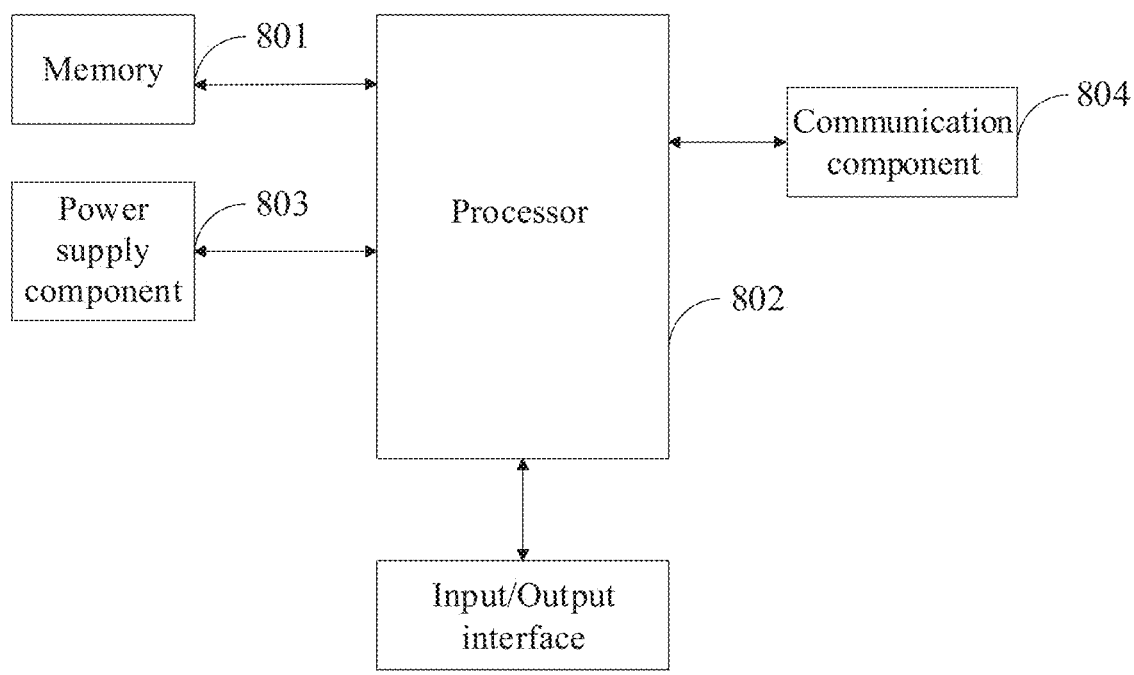
FIG. 8 is a structural schematic diagram of an electronic device according to some embodiments.

Based on the foregoing embodiments and referring to FIG. 8, in some embodiments, an electronic device is provided. The electronic device includes at least a memory 801 and a processor 802, where:

the memory 801 is configured to store the executable instructions;

the processor 802 is configured to read and execute the executable instructions stored in the memory to implement:

playing an image in an image playing interface in response to an image playing request sent by an account;

determining a target presentation area in the image playing interface in response to detecting a touch operation of the account on the image playing interface, wherein the target presentation area is used for presenting feedback information of the image and the feedback information includes a set of emojis;

determining the set of emojis based on feature labels of the image;

rendering emojis in the set to the target presentation area.

a power supply component 803 is configured to provide the electrical energy:

a communication component 804 is configured to implement the communication function.

In some embodiments, when determining a target presentation area in the image playing interface based on a touch operation of the account on the image playing interface, the processor 802 is configured for:

determining a candidate presentation area based on a touch point in the image playing interface, wherein the touch point is determined based on the touch operation:

determining a candidate location set in the candidate presentation area based on the touch point and an angle range set wherein the candidate location set conforms to a location presentation rule and candidate locations are used for rendering respective emojis;

determining the target presentation area based on the candidate presentation area for which the candidate location set has been determined.

In some embodiments, when determining a candidate presentation area based on a touch point, the processor 802 is configured to:

generating the candidate presentation area based on coordinates of an initial touch point, wherein the initial touch point is determined based on the touch operation;

updating the candidate presentation area based on the touch point iteratively in response to the candidate presentation area not conforming to an area presentation rule, wherein the touch point is adjusted based on the initial touch point.

In some embodiments, when obtaining coordinates of an adjusted touch point, the processor 802 is configured for:

determining an overlap ratio between the candidate presentation area and the image playing interface;

updating the touch point by adjusting the initial touch point based on a center of the image playing interface iteratively in response to the overlap ratio being out of a threshold range.

In some embodiments, when determining a candidate location set, the processor 802 is configured for:

determining an offset angle corresponding to each emoji in the candidate presentation area based on a result of dividing an angle range, where the angle range is selected from the angle range set;

calculating a candidate location corresponding to each emoji in the candidate presentation area based on a location area radius and the offset angle;

determining that all candidate locations conform to the location presentation rule in response to all candidate locations being located in the image playing interface.

In some embodiments, the feature label is any one or a combination of:

category of the image;

emoji used by the account with a usage frequency reaching a threshold;

geographic location of the account login;

emojis used for this image with a usage frequency during a period reaching the threshold.

Based on the above embodiments, a non-transitory computer-readable storage medium is provided. When the instructions in the storage medium are executed by a processor, the processor performs the steps of any method described above.

After considering the specification and practicing the invention disclosed here, those skilled in the art will readily come up with other embodiments of the disclosure. The present application is intended to encompass any variations, usages or applicability changes of the disclosure, and these variations, usages or applicability changes follow the general principle of the disclosure and include the common knowledge or customary technological means in the technical field which is not disclosed in the disclosure. The specification and embodiments are illustrative only, and the true scope and spirit of the disclosure is pointed out by the following claims.

It should be understood that the disclosure is not limited to the precise structures which have been described above and shown in the figures, and can be modified and changed

What is claimed is:

1. A method of content presentation, comprising:
   playing an image in an image playing interface in response to receiving an image playing request sent by an account;
   determining a target presentation area in the image playing interface in response to detecting a touch operation of the account on the image playing interface, wherein the target presentation area is used for presenting feedback information of the image, wherein the feedback information comprises a set of emojis;
   determining the set of emojis based on feature labels of the image;
   rendering emojis in the set to the target presentation area;
   wherein said determining the target presentation area in the image playing interface in response to detecting the touch operation of the account on the image playing interface, comprising:
      determining a candidate presentation area based on a touch point in the image playing interface, wherein the touch point is determined based on the touch operation;
      determining a candidate location set in the candidate presentation area based on the touch point and an angle range set, wherein the candidate location set conforms to a location presentation rule and candidate locations are used for rendering respective emojis; and
      determining the target presentation area based on the candidate presentation area for which the candidate location set has been determined;
   wherein the candidate location set conforms to the location presentation rule, comprising:
      determining an offset angle corresponding to each emoji in the candidate presentation area based on a result of dividing an angle range, wherein the angle range is selected from the angle range set;
      calculating a candidate location corresponding to each emoji in the candidate presentation area based on a location area radius and the offset angle; and
      determining that all candidate locations conform to the location presentation rule in response to all candidate locations being located in the image playing interface.

2. The method according to claim 1, wherein the determining of the candidate presentation area based on the touch point, comprising:
   generating the candidate presentation area based on coordinates of an initial touch point, wherein the initial touch point is determined based on the touch operation; and
   updating the candidate presentation area based on the touch point iteratively in response to the candidate presentation area not conforming to an area presentation rule, wherein the touch point is adjusted based on the initial touch point.

3. The method according to claim 2, wherein the touch point is adjusted based on the initial touch point comprising:
   determining an overlap ratio between the candidate presentation area and the image playing interface; and
   updating the touch point by adjusting the initial touch point based on a center of the image playing interface iteratively in response to the overlap ratio being out of a threshold range.

4. The method according to claim 1, wherein the feature label comprises any one or a combination of:
   category of the image;
   emoji used by the account with a usage frequency reaching a threshold;
   geographic location of an account login; and
   emojis used for this image with a usage frequency during a period reaching the threshold.

5. An electronic device, comprising:
   a memory configured for storing executable instructions;
   a processor coupled to the memory and configured for reading and executing the executable instructions stored in the memory to implement:
   playing an image in an image playing interface in response to receiving an image playing request sent by an account;
   determining a target presentation area in the image playing interface in response to detecting a touch operation of the account on the image playing interface, wherein the target presentation area is used for presenting feedback information of the image, wherein the feedback information comprises a set of emojis;
   determining a set of emojis based on feature labels of the image;
   rendering emojis in the set to the target presentation area;
   wherein said determining the target presentation area in the image playing interface in response to detecting the touch operation of the account on the image playing interface, comprising:
      determining a candidate presentation area based on a touch point in the image playing interface, wherein the touch point is determined based on the touch operation;
      determining a candidate location set in the candidate presentation area based on the touch point and an angle range set, wherein the candidate location set conforms to a location presentation rule and candidate locations are used for rendering respective emojis; and
      determining the target presentation area based on the candidate presentation area for which the candidate location set has been determined;
   wherein the candidate location set conforms to the location presentation rule, comprising:
      determining an offset angle corresponding to each emoji in the candidate presentation area based on a result of dividing an angle range, wherein the angle range is selected from the angle range set;
      calculating a candidate location corresponding to each emoji in the candidate presentation area based on a location area radius and the offset angle; and
      determining that all candidate locations conform to the location presentation rule in response to all candidate locations being located in the image playing interface.

6. The electronic device according to claim 5, wherein the determining of the candidate presentation area based on the touch point, comprising:
   generating the candidate presentation area based on coordinates of an initial touch point, wherein the initial touch point is determined based on the touch operation;
   updating the candidate presentation area based on the touch point iteratively in response to the candidate presentation area not conforming to an area presentation rule, wherein the touch point is adjusted based on the initial touch point.

7. The electronic device according to claim 6, wherein the touch point is adjusted based on the initial touch point comprising:
  determining an overlap ratio between the candidate presentation area and the image playing interface; and
  updating the touch point by adjusting the initial touch point based on a center of the image playing interface iteratively in response to the overlap ratio being out of a threshold range.

8. The non-transitory computer-readable storage medium according to claim 7, wherein the touch point is adjusted based on the initial touch point comprising:
  determining an overlap ratio between the candidate presentation area and the image playing interface;
  updating the touch point by adjusting the initial touch point based on a center of the image playing interface iteratively in response to the overlap ratio being out of a threshold range.

9. The electronic device according to claim 5, wherein the feature label comprises any one or a combination of:
  category of the image;
  emoji used by the account with a usage frequency reaching a threshold;
  geographic location of an account login; and
  emojis used for this image with a usage frequency during a period reaching the threshold.

10. A non-transitory computer-readable storage medium comprising instructions configured to cause one or more processor to implement:
  playing an image in an image playing interface in response to receiving an image playing request sent by an account;
  determining a target presentation area in the image playing interface in response to detecting a touch operation of the account on the image playing interface, wherein the target presentation area is used for presenting feedback information of the image, wherein the feedback information comprises a set of emojis;
  determining a set of emojis based on feature labels of the image;
  rendering emojis in the set to the target presentation area wherein said determining the target presentation area in the image playing interface in response to detecting the touch operation of the account on the image playing interface, comprising:
  determining a candidate presentation area based on a touch point in the image playing interface, wherein the touch point is determined based on the touch operation;
  determining a candidate location set in the candidate presentation area based on the touch point and an angle range set, wherein the candidate location set conforms to a location presentation rule and candidate locations are used for rendering respective emojis; and
  determining the target presentation area based on the candidate presentation area for which the candidate location set has been determined;
  wherein the candidate location set conforms to the location presentation rule, comprising:
    determining an offset angle corresponding to each emoji in the candidate presentation area based on a result of dividing an angle range, wherein the angle range is selected from the angle range set;
    calculating a candidate location corresponding to each emoji in the candidate presentation area based on a location area radius and the offset angle; and
    determining that all candidate locations conform to the location presentation rule in response to all candidate locations being located in the image playing interface.

11. The non-transitory computer-readable storage medium according to claim 10, wherein the determining of the candidate presentation area based on the touch point, comprising:
  generating the candidate presentation area based on coordinates of an initial touch point, wherein the initial touch point is determined based on the touch operation;
  updating the candidate presentation area based on the touch point iteratively in response to the candidate presentation area not conforming to an area presentation rule, wherein the touch point is adjusted based on the initial touch point.

12. The non-transitory computer-readable storage medium according to claim 10, wherein the feature label comprises any one or a combination of:
  category of the image;
  emoji used by the account with a usage frequency reaching a threshold;
  geographic location of an account login; and
  emojis used for this image with a usage frequency during a period reaching the threshold.

* * * * *